United States Patent [19]

McMurtrie

[11] Patent Number: 4,465,061
[45] Date of Patent: Aug. 14, 1984

[54] SOLAR ENERGY HEATING PANEL

[76] Inventor: Thomas McMurtrie, 61475 W. Eleven Mile Rd., South Lyon, Mich. 48178

[21] Appl. No.: 369,740

[22] Filed: Apr. 19, 1982

[51] Int. Cl.³ .............................................. F24J 3/02
[52] U.S. Cl. ..................................... 126/449; 126/418
[58] Field of Search ............... 126/450, 417, 439, 441, 126/449; 165/185

[56] References Cited

U.S. PATENT DOCUMENTS 4,207,868 6/1980 Peterson .............................. 126/450

FOREIGN PATENT DOCUMENTS 2476812 8/1981 France ................................ 126/450

Primary Examiner—Samuel Scott
Assistant Examiner—G. Anderson
Attorney, Agent, or Firm—Hauke and Patalidis

[57] ABSTRACT

A solar energy collecting and radiating panel for heating a fluid such as air circulating in an enclosure disposed behind the panel. The panel is in the form of a pan made of sheet metal, such as thin aluminum, darkened on its irradiated surface, the blackened or darkened surface being protected by a pane of glass. The panel has a plurality of dome-shaped dimples embossed on and projecting from its irradiated surface such as to present a large surface area to exposure to sun rays and to capture solar energy independently of the sun height or position relative to the horizon. The heat absorbed by the panel is conveyed by its back surface to air circulating by convection or by forced circulation in a thermally insulated enclosure, for heating a building or for any other utilization. A plurality of panels may be disposed side by side to form a solar energy collecting array preferably mounted on an outside wall of a building, in a southerly orientation.

15 Claims, 7 Drawing Figures

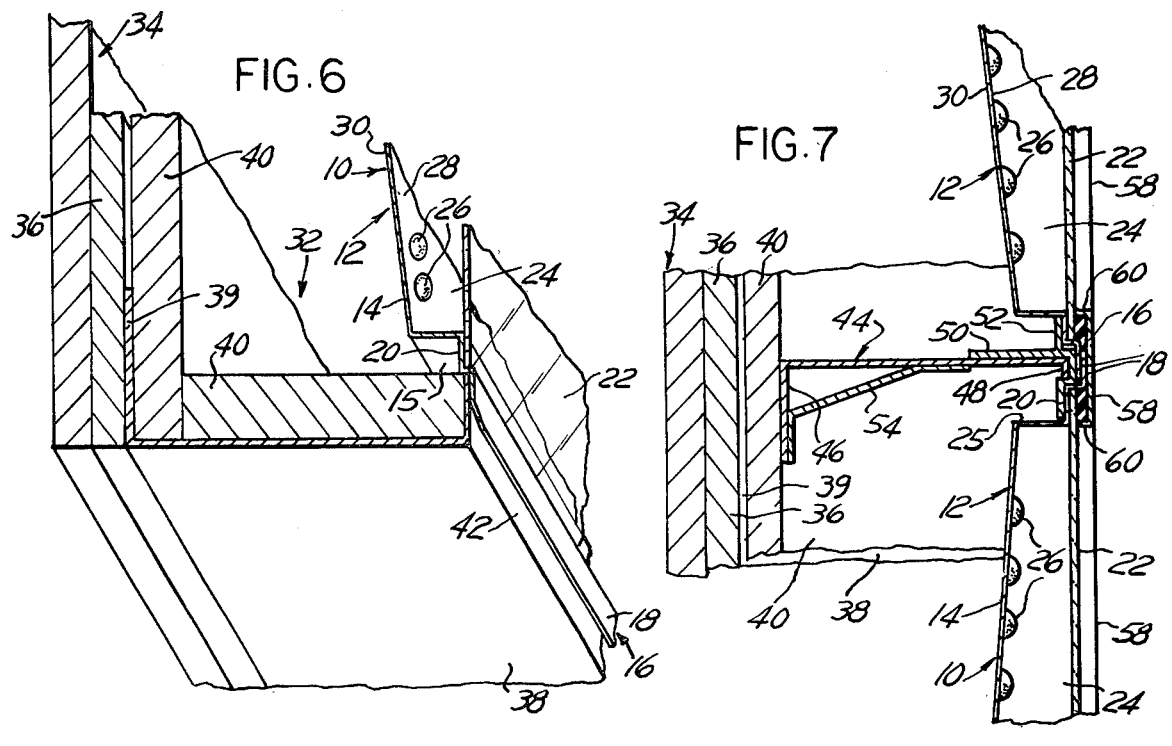
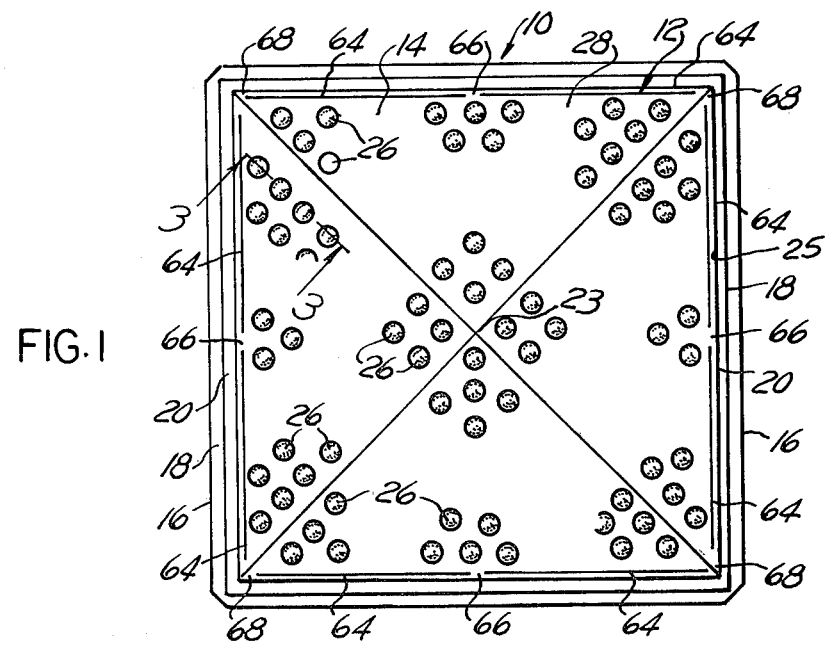
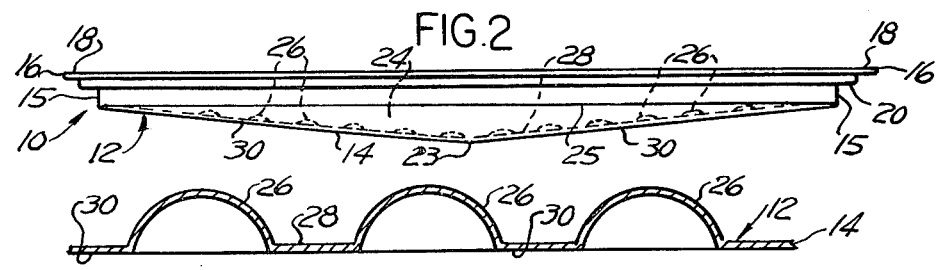

SOLAR ENERGY HEATING PANEL

BACKGROUND OF THE INVENTION

The present invention relates to solar energy collecting structures in general and more particularly to a solar energy collecting panel, which may be mounted singly or severally on a vertical or slanted position for converting solar energy to heat for heating air circulating in an enclosure disposed behind the panel or panels.

Solar heating systems are rapidly becoming a practical and effective energy source for space heating of buildings, or for other useful applications requiring a heat source. Solar heat collecting panels are generally installed on the roofs of buildings, or on a slant, such as to present as large an area exposed to sun rays as possible, and such as to present direct exposure to sun rays. Roof installation of solar energy absorbing panels present many inconveniences in northern regions where the advantages resulting from capturing free solar energy is most desirable, as snow covering the panels must be either removed or allowed to melt prior to benefiting from the advantages provided by the system.

Vertical mounting of solar energy collecting panels on an exterior wall of a building is more convenient than roof or slant mounting as greatly facilitating installation, maintenance, and cleaning of the panel exterior surfaces at infrequent interval, and as preventing snow accumulation. The solar energy collecting and absorbing panels of the invention present particular advantages for wall mount, as a result of the particular structure of the individual panels which provides an area of sun ray absorbing surface substantially larger than the over-all area of the individual panels, and as a result of a modular structure permitting to custom-fit installations by assemblying a plurality of individual panels over a common air box or enclosure covering the available surface area of, for example, the vertical wall of a building.

SUMMARY OF THE INVENTION

The invention accomplishes its objects by providing a unitary solar energy collecting and transferring panel of a convenient nominal area, a plurality of which are assembled, when desired, side by side over a common air box or enclosure through which circulates a fluid, such as air, to which the solar energy, in form of heat, which is absorbed by each individual panel is transferred for heating a building, or for any other useful purpose where heat is required. The solar energy absorbing panels of the invention provide a modular structure which, through assembly of a plurality of identical low-cost absorbing panels of thin metal sheet result in a highly efficient system, particularly convenient for mounting on a vertical or slanted wall, and which provide maximum absorption of solar heat energy and transfer to a working-fluid within a wide range of angular exposure to direct or slanted sun rays, which is easy to install, at relatively low cost, which requires a minimum amount of maintenance and which provides years of trouble-free operation.

These and other advantages of the present invention will become apparent to those skilled in the art when the following description of the best mode contemplated for practicing the invention is read in conjunction with the accompanying drawing, illustrating a structural example thereof given for illustrative purpose only, and wherein:

BRIEF DESCRIPTION OF THE DRAWING

FIG. 1 is a top elevation view of a solar energy absorbing panel according to the present invention;

FIG. 2 is an end view thereof at a slightly enlarged scale;

FIG. 3 is a partial section, at an enlarged scale, along line 3—3 of FIG. 1;

FIG. 6 is a view similar to FIGS. 4 and 5 but showing a partially assembled perimeter portion of said installation; and FIG. 7 is partial sectional view along line 7—7 of FIG. 5.

DETAILED DESCRIPTION OF THE PREFERRED EMBODIMENT

Figure 4:
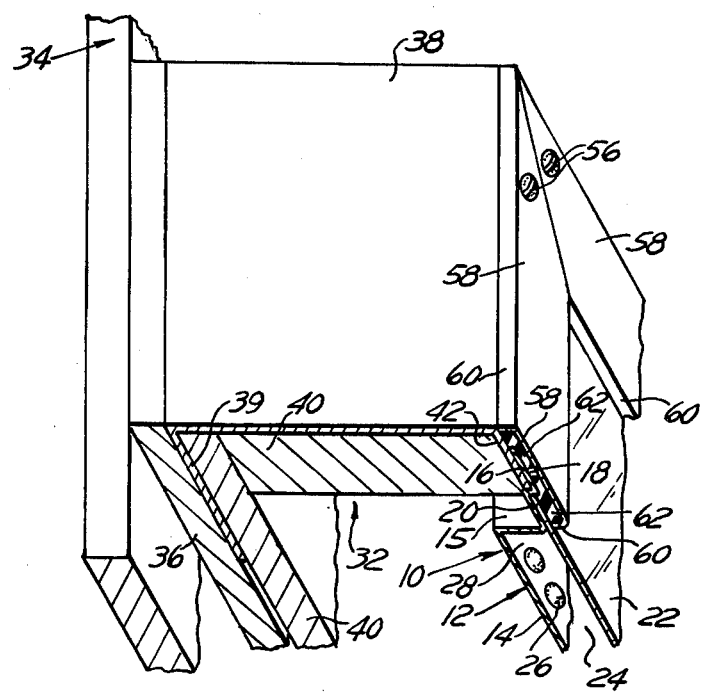
FIG. 4 is a perspective schematic partial view of a portion of a solar energy heating installation utilizing solar energy absorbing panels according to the present invention.

Referring now to the drawing, and more particularly to FIGS. 1-3 thereof, the invention is a solar energy heating system comprising one or more solar energy individual units or panels 10, all preferably identical in shape and in size for simplification of construction and for low cost production in quantity. Each solar energy absorbing panel 10 takes the form of a pan 12 made or formed, such as by stamping, of thin metallic sheet such as, for example and preferably, aluminum of relatively thin gauge, for example in a range of a fraction of a millimeter to a few millimeters in thickness. The pan 12 is preferably square as seen in elevation, and can be made in any appropriate dimensions, for example in the range of 50×50 cm. to 150 × 150 cm. Each pan has a shallow generally pyramidal bottom 14 and a peripheral wall 15 integrally joinning the shallow pyramidal bottom 14 to an outwardly projecting stepped flange 16. The stepped flange 16 defines a flat mounting flange portion 18 surrounding a ledge recessed surface 20 in which is fitted the edge of a pane 22 of glass, or other transparent material. An air space 24 is thus formed between the bottom wall 14 of the pan 12 and the pane 22 of glass, the air space 24 being substantially narrow, such as for example 3-4 cm. at its greatest width corresponding to the apex 23 of the pan pyramidal bottom wall 14 disposed at a level lower than the level defined by the integral junction 25 of the bottom wall 14 with the peripheral wall 15.

Forming the bottom wall 14 of the pan 12 in the shallow pyramidal shape illustrated provides increased strength and rigidity to the pan 12 in spite of the thinness of the sheet metal. The surface of the bottom panel 14 of the pan 12 is provided with a plurality of embossed dome-like dimples 26 pressed out of the plane of the bottom wall 14 and projecting toward the glass pane 22. When the solar heat energy absorbing panel 10 is installed in such manner that the tray bottom wall 14 provided with the dome-like dimples 26 is impinged upon by the sun rays passing through the pane 22 of glass, the area exposed to the sun rays is substantially larger than the overall area within the peripheral wall 15 of the pane 22, due mostly to the presence of the dimples 26 pressed out of the plane of the tray bottom wall 14 and, to a lesser degree, due to the pyramidal shape of the pan bottom wall 14. The surface 28 of the bottom wall 14 exposed to the sun rays is darkened or blackened, by any well known method such as anodizing for example, such as to strongly absorb the sun rays. Even if the sun rays impinge upon the surface 28 of the pan bottom wall 14 at an angle, a large proportion of the sun rays is caused to impinge upon the blackened surface of the dimples 26 at a more effective direct angle. In addition, the embossed dimples 26 provide a considerable increase in strength and rigidity of the pyramidal pan bottom 14, and both the dimples 26 and the pyramidal shape of the pan bottom 14 contribute in presenting a substantial surface area for irradiation by the sun energy, within a wide range of variations in the sun height over the horizon and within a wide range of the sun apparent motion from one end of the horizon to the other during the day.

The shaded side 30 of the pan bottom wall 14 is left untreated such as to present a clear metallic highly convecting surface transmitting heat to the air in contact with the shaded surface 30. The surface 30 may be coated with a thin transparent protective coating, such as a thin acrylic resin, for example, to prevent corrosion. The dimples 26 cause turbulence of the air flowing along the shaded surface 30 of the pan bottom wall 14.

Figure 5:
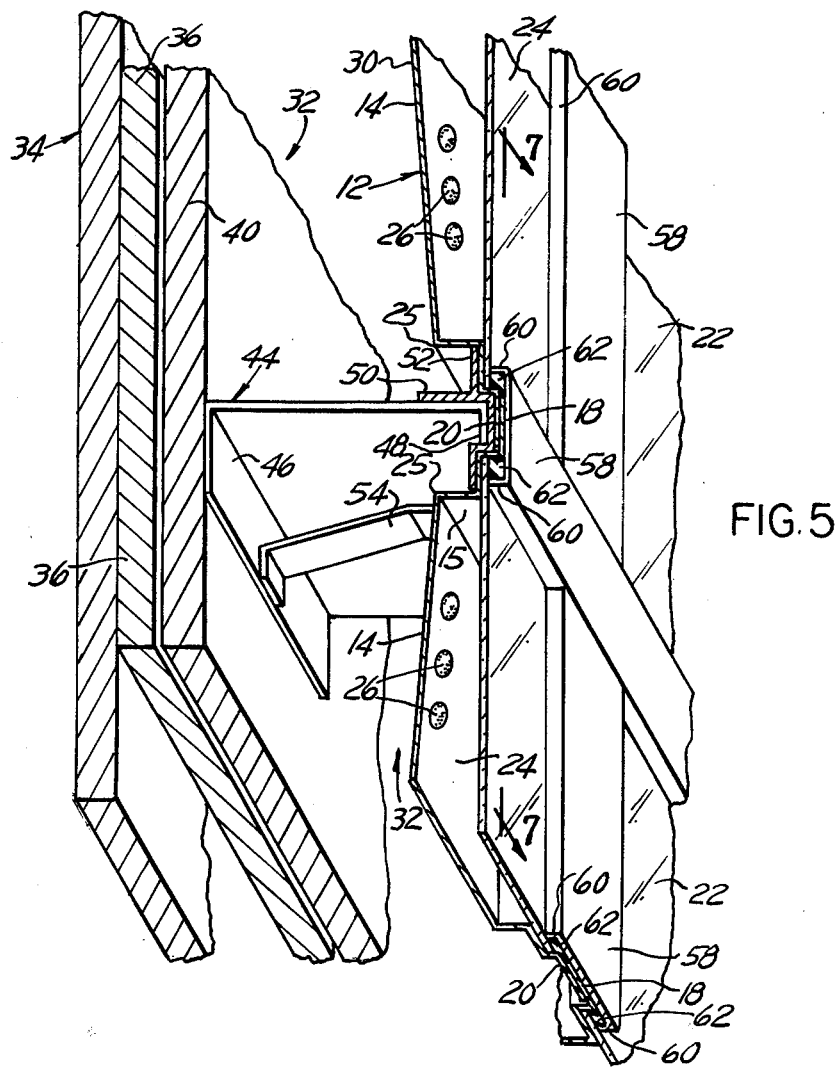
FIG. 5 is a view similar to FIG. 4 but illustrating an intermediary portion of the installation, partially assembled.

As illustrated at FIGS. 4–7 a plurality of solar energy absorbing panels 10 installed side by side are mounted on a vertical position over an air circulation box or enclosure, generally designated at 32, disposed on an outside wall 34 of a building, such as a dwelling house for example. The air circulation box 32 is provided with a cold air inlet, not shown, from the building and with a hot air outlet, not shown, into the building. Forced air circulation by means of electrically driven blowers may be used to circulate the air through the enclosure 32 but, preferably, the air is circulated between the air box or enclosure 32 and the building simply by convection or "thermal syphoning" without blowers, in order to save electrical energy.

The air circulation box or enclosure 32 is generally in the form of a square or rectangular enclosure attached vertically for example to a vertical outer wall 34 of the building. The air circulation box 32 has a bottom wall 36, for example in the form of wood panels attached to the building wall 34, and a perimeter wall 38 made of sheet metal. The perimeter wall 38 has a bottom flange 39 attached to the bottom wall 36 of the air circulation box or enclosure 32. The bottom wall 36 and the perimeter wall 38 are lined with sheets of thermal insulation material 40.

The air circulation box 32 is closed on its remaining side by one or a plurality of solar energy collector pans 12 supported at their flanged edge 16 by a flange 42 formed at the top edge of the peripheral wall 38, the stepped up portion of the pan flange 16 engaging the peripheral wall flange 42. In installation using at least a pair of solar energy collector pans 12 a spacer and support member 44 having an angled base 46 and an angled top flange 48 is attached to the back or bottom wall 36 provided with its insulating liner 40 to support and locte adjoining pans 12 with their respective flat mounting flange portions 18 of the flange 16 superimposed, an appropriately shaped insert 50 being placed over the top flange 48 of the support member 44, FIGS. 5 and 7, having a stepped supporting platform integral portion 52 of a shape adapted to engage the stepped flange 16 of the solar heat collector pans 12, with their elevated flange portions 18 superimposed, as shown. The spacer and support member 44 is preferably provided with a brace member or bracket 54 to increase its rigidity and to help in supporting the weight of the assembly of solar energy collecting pans 12. The spacer and support member 44 is preferably metallic and the insert 50 may be a metallic or, preferably, a plastic extrusion.

The base 46 of the spacer support member 44 is screwed or bolted to the back wall 36 through the insulating layer 40, and the solar heat collecting pans 12 are attached at their edge flange 16 to the top bracket of the perimeter wall 38 by means of screws such as self-tapping screws, as shown at 56, which are also holding in position lengths of glazing cap 58. The glazing cap 58 is in the form of a plastic or metallic U-shaped channel retaining between its side walls 60 and elastomeric sealing tape 62, having a portion of its face in engagement with the elevated flanged portion 18 of the solar energy collecting pan 12 and another portion in engagement with the surface of the pane 22 of glass. A length of glazing cap 58 is also installed and affixed, in the same manner, over the joined superimposed portions 18 of adjacent solar energy collecting pans 14, where supported by the spacer and support member 44.

The air circulation box 32 is, as previously mentioned, provided with a hot air inlet into a building and a cold air outlet from the building, such that the air circulating through the air circulation box 32 is heated from the heat radiating lower surface 30 of the solar energy collecting pans 12 when exposed to sunlight. The spacer and support members 44 are relatively short and appropriate apertures may be formed through the spacer support members 44 such that the spacer and support members do not present any appreciable obstructions to the air circulating in the air circulation box or enclosure 32.

Forming the solar energy collecting panels 10 of a single appropriately shaped piece of sheet metal presents the advantages of simplification of structure and of low cost manufacturing. However, because the metal is highly conductive of the heat, some slight reduction in efficiency is caused by transmitting heat from the bottom wall 14, FIGS. 1 and 2, to the peripheral wall 15 and to the flanges 16 which are substantially in contact with the ambient, although, as previously mentioned, the flanges 16 are covered by the glazing strips 58 provided with the elastomeric tape 62 which partially acts as a heat insulator between the ambient and the flanges 16. Heat convection to the ambient may be limited by bonding the flanges 16 of a non-conductive material such as a plastic or, in the alternative, and as illustrated at FIG. 1, by forming the pan 12 of a single piece of sheet metal provided with a plurality of slits 64 proximate the junction of the bottom wall 14 with the peripheral wall 15 of the pans 12. A narrow bridge of sheet metal, as shown at 66 between consecutive slits 64, and a narrow bridge of sheet metal as shown at 68 at each corner of the pan, provide structural connection between the pan bottom wall 14 and the peripheral wall 15, but results in very little heat losses in view of the small mass of metal capable of transmitting heat from the panel bottom wall 14 to the flange 16. The slits 64, which can be made as narrow as desired, act as very effective heat transmission barriers, at very low cost and without losing the advantage of a single piece sheet metal structure for the solar energy absorbing panel 10.

The slits 64, instead of being formed in the pan bottom wall 14, may be disposed in the peripheral wall 15.

Having thus described the present invention by way of an example of structure for solar energy collecting and absorbing panel associated with appropriate holding and support members forming a hot air circulation and heat exchanging device, modification whereof will be apparent to those skilled in the art, what is claimed as new is as follows:

1. A solar energy absorbing panel for converting sun rays into heat, said panel comprising a pan having a sheet metal bottom wall and a peripheral wall, a radially extending flange portion projecting from said pan peripheral wall, and a plurality of dome-like dimples formed out of said bottom wall and projecting from the plane of said bottom wall into said pan, said bottom wall and said dome-like dimples having their surface blackened for absorbing heat energy from said sun rays, wherein said bottom wall, said pan peripheral wall and said flange portion are formed integrally of a single metal sheet, said panel further comprising slits defining heat conveying preventing means between said bottom wall and said flange portion.

2. The panel of claim 1 further comprising a pane of transparent material supported by said flange portion.

3. The panel of claim 2 wherein said pane of transparent material is a pane of glass and said flange portion has a recessed ledge engaging the edge of said pane of glass.

4. The panel of claim 1 wherein said pan is substantially rectangular and said bottom wall forms a shallow pyramid.

5. The panel of claim 4 wherein said shallow pyramid has an apex disposed at a level lower than the level defined by the junction of said bottom wall with said peripheral wall.

6. The panel of claim 1 further comprising a box-like enclosure having bottom and peripheral walls, and means for attaching said panel over the open end of said enclosure with said flange portion of said panel attached to the edge of said enclosure peripheral wall, said pan bottom wall and said pan peripheral wall projecting within said enclosure, whereby atmospheric air in said enclosure is heated by contact with said pan bottom wall upon exposure of said panel to sun rays.

7. The panel of claim 2 further comprising a box-like enclosure having bottom and peripheral walls, and means for attaching said panel over the open end of said enclosure with said flange portion of said panel attached to the edge of said enclsoure peripheral wall, said pan bottom wall and said pan peripheral wall projecting within said enclosure, whereby atmospheric air in said enclosure is heated by contact with said pan bottom wall upon exposure of said panel to sun rays. said pan 8. The panel of claim 3 further comprising a box-like enclosure having bottom and peripheral walls, and means for attaching said panel over the open end of said enclosure with said flange portion of said panel attached to the edge of said enclosure peripheral wall, said pan bottom wall and said pan peripheral wall projecting within said enclosure, whereby atmospheric air in said enclosure is heated by contact with said pan bottom wall upon exposure of said panel to sun rays.

9. The panel of claim 4 further comprising a box-like enclosure having bottom and peripheral walls, and means for attaching said panel over the open end of said enclosure with said flange portion of said panel attached to the edge of said enclosure peripheral wall, said pan bottom wall and said pan peripheral wall projecting within said enclosure, whereby atmospheric air in said enclosure is heated by contact with said pan bottom wall upon exposure of said panel to sun rays.

10. The panel of claim 5 further comprising a box-like enclosure having bottom and peripheral walls, and means for attaching said panel over the open end of said enclosure with said flange portion of said panel attached to the edge of said enclosure peripheral wall, said pan bottom wall and said pan peripheral wall projecting within said enclosure, whereby atmospheric air in said enclosure is heated by contact with said pan bottom wall upon exposure of said panel to sun rays.

11. A modular solar energy heating system comprising at least one solar energy absorbing panel, said panel comprising a pan having a sheet metal bottom wall and a peripheral wall, a radially extending flange portion projecting from said peripheral wall, said bottom wall having its surface blackened for absorbing heat energy from said sun rays, a pane of transparent materal supported by said flange portion, a box-like enclosure having bottom and peripheral walls, means for attaching said panel over the open end of said enclosure with said flange portion of said panel attached to the edge of said enclosure peripheral wall, said pan bottom wall and said pan peripheral wall projecting within said enclosure, whereby atmospheric air in said enclosure is heated by contact with said pan bottom wall upon exposure of said panel to sun rays, a plurality of dome-like dimples formed out of said pan bottom wall and projecting from the plane of said pan bottom wall toward said pane of transparent material, wherein said pan bottom wall, said pan peripheral wall and said pan flange portion are formed integrally of a single metal sheet, and slits are disposed between said pan bottom wall and said pan flange portion.

12. The modular solar energy system of claim 11 wherein said pane of transparent material is a pane of glass and said pan flange portion has a recessed ledge engaging the edge of said pane of glass.

13. The modular solar energy system of claim 11 wherein said pan is substantially rectangular and said pan bottom wall forms a shallow pyramid.

14. The modular solar energy system of claim 13 wherein said shallow pyramid has an apex disposed at a level lower than the level defined by the junction of said pan bottom wall with said pan peripheral wall.

15. The modular solar energy system of claim 11 wherein said bottom wall, said peripheral wall and said pan flange portion are formed integrally of a single metal sheet.

* * * * *

UNITED STATES PATENT AND TRADEMARK OFFICE
CERTIFICATE OF CORRECTION

PATENT NO. : 4,465,061
DATED : August 14, 1984
INVENTOR(S) : Thomas McMurtrie

It is certified that error appears in the above-identified patent and that said Letters Patent are hereby corrected as shown below:

| | |
|---|---|
| Column 2, line 41 | "joinning" should read --joining-- |
| Column 3, line 62 | "lock" should read --locate-- |
| Column 4, line 52 | "of" should read --with-- |
| Column 5, line 53 | The sentence should end at "...to sun rays." |
| Column 6, line 57 | should read --wherein said pan bottom wall, said pan peripheral wall and said-- |

Signed and Sealed this

Twenty-fifth Day of December 1984

[SEAL]

Attest:

Attesting Officer

GERALD J. MOSSINGHOFF

*Commissioner of Patents and Trademarks*